(12) United States Patent
Bazzo et al.

(10) Patent No.: US 7,210,921 B2
(45) Date of Patent: *May 1, 2007

(54) NOZZLE FOR INJECTION MOULDING OF PLASTIC MATERIALS

(75) Inventors: Maurizio Bazzo, Oderzo (IT); Boscariol Tiziano, Buccinasco (IT)

(73) Assignee: Amuleto Trading and Marketing LDA, Funchal, Madeira (PT)

( * ) Notice: Subject to any disclaimer, the term of this patent is extended or adjusted under 35 U.S.C. 154(b) by 0 days.

This patent is subject to a terminal disclaimer.

(21) Appl. No.: 11/463,374

(22) Filed: Aug. 9, 2006

(65) Prior Publication Data

US 2006/0275527 A1 Dec. 7, 2006

Related U.S. Application Data

(63) Continuation of application No. 09/987,749, filed on Nov. 15, 2001, now Pat. No. 7,131,831.

(30) Foreign Application Priority Data

Apr. 27, 2001 (IT) ........................... TO2001A0399

(51) Int. Cl.
B29C 45/20 (2006.01)

(52) U.S. Cl. .................... 425/549; 264/328.15

(58) Field of Classification Search ............... 425/549; 264/328.15

See application file for complete search history.

(56) References Cited

U.S. PATENT DOCUMENTS

| 6,394,784 B1 * | 5/2002 | Gellert et al. ............... 425/549 |
| 6,638,053 B2 | 10/2003 | Gellert et al. |
| 6,761,557 B2 | 7/2004 | Gellert et al. |
| 2004/0037913 A1 | 2/2004 | Gellert et al. |

FOREIGN PATENT DOCUMENTS

| EP | 750975 | * | 1/1997 |
| EP | 1252998 A3 | | 4/2002 |
| EP | 1252998 A2 | | 10/2002 |
| EP | 1252998 B1 | | 10/2004 |
| EP | 1484157 A2 | | 12/2004 |
| EP | 1484157 A3 | | 3/2005 |

* cited by examiner

Primary Examiner—Tim Heitbrink
(74) Attorney, Agent, or Firm—Heslin Rothenberg Farley & Mesiti P.C.; Victor A. Cardona, Esq.

(57) ABSTRACT

Nozzle for injection moulding of plastic materials, comprising a generally cylindrical body with spiral-shaped groove on the external surface, in which a first and a second heating resistor which are independent from each other and which are equipped with respective autonomous controlling thermocouples, are wound.

11 Claims, 2 Drawing Sheets

Fig_1
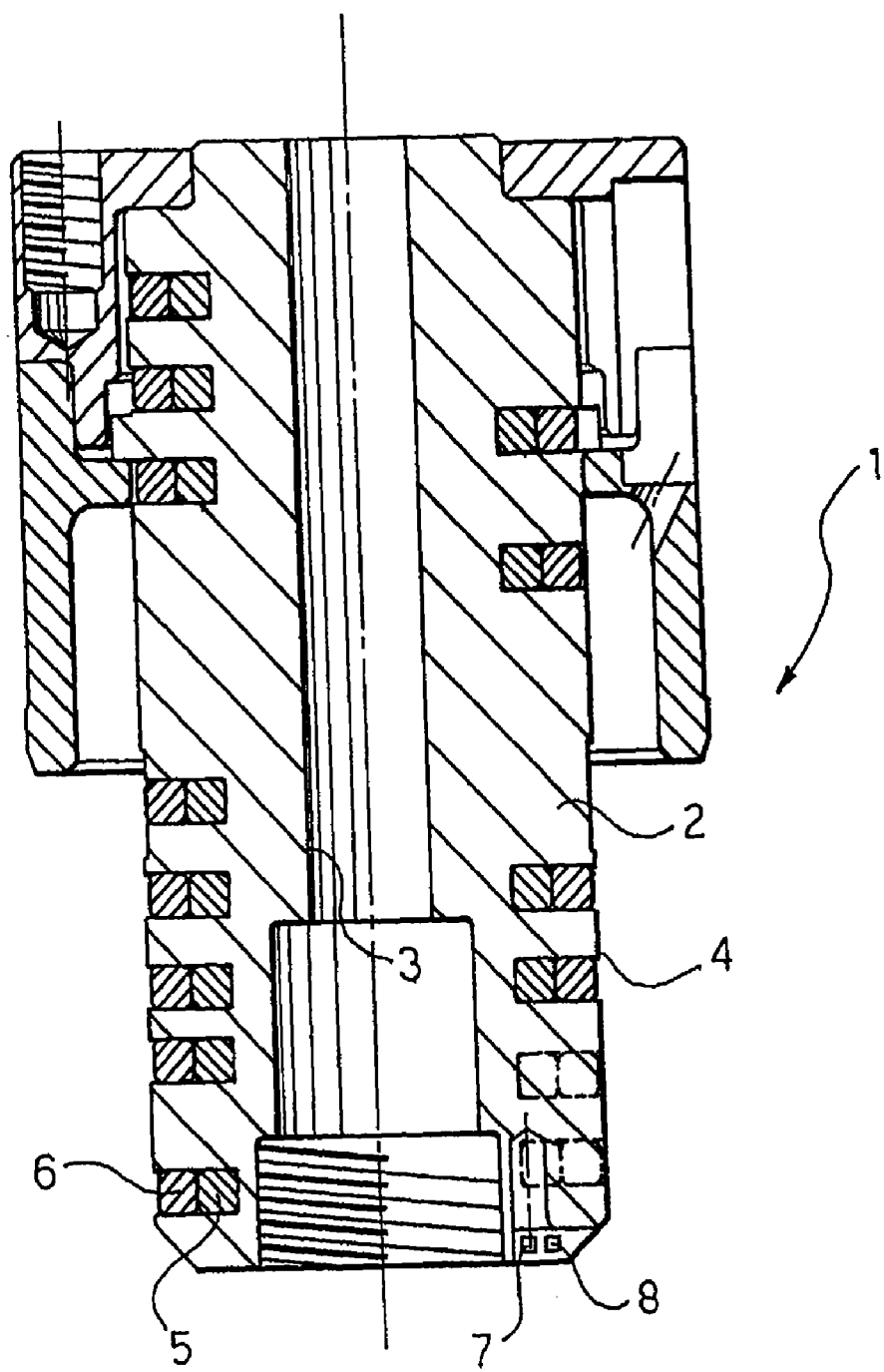

Fig_2
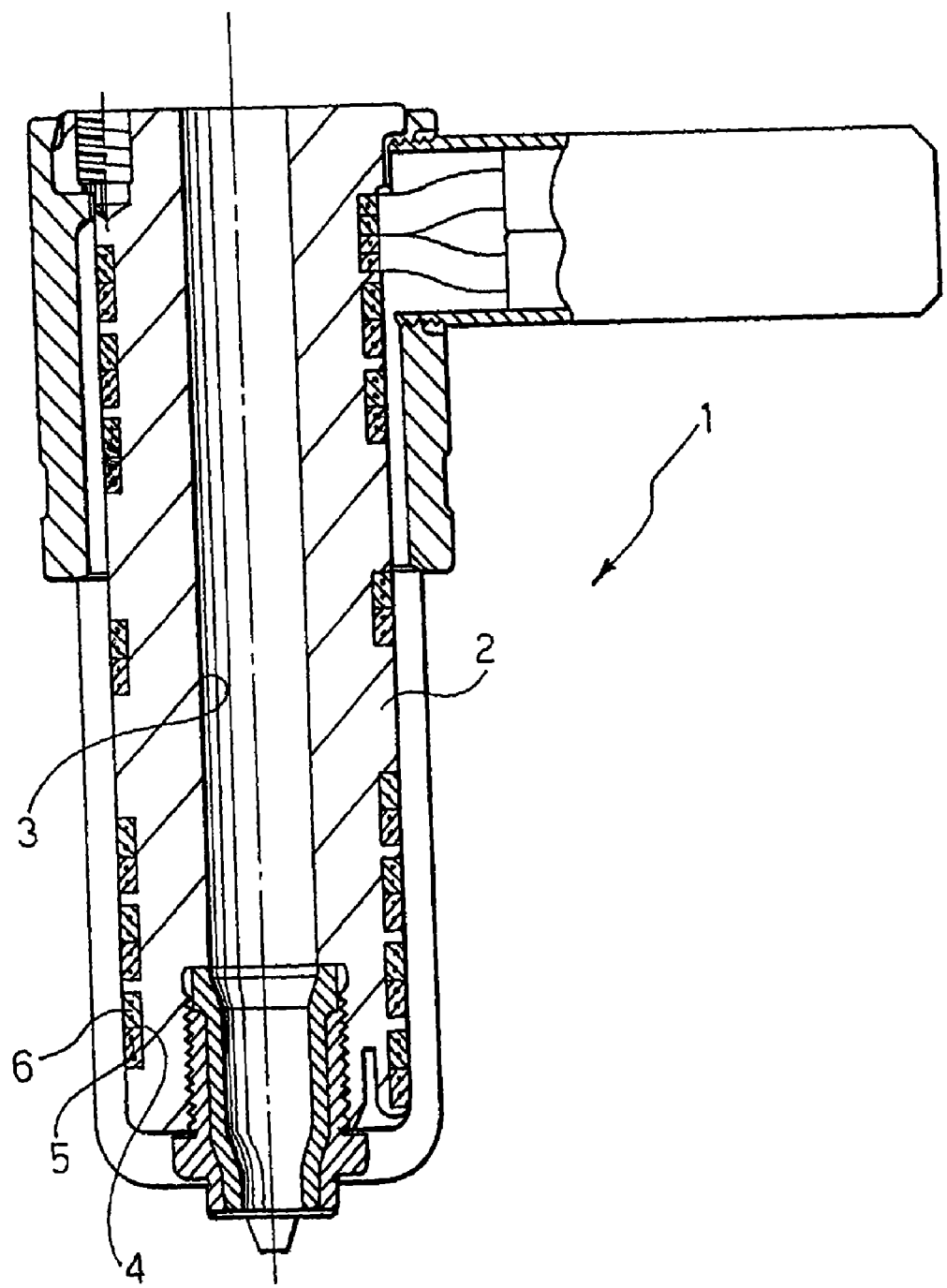

NOZZLE FOR INJECTION MOULDING OF PLASTIC MATERIALS

CROSS-REFERENCE TO RELATED APPLICATIONS

This application is a continuation of U.S. patent application Ser. No. 09/987,749, filed Nov. 15, 2001, now U.S. Pat. No. 7,131,831 entitled "NOZZLE FOR INJECTION MOULDING OF PLASTIC MATERIALS", Bazzo et al., which claims priority from Italian Patent Application No. TO2001A000399, filed Apr. 27, 2001, the entireties of which are hereby incorporated herein by reference.

FIELD OF THE INVENTION

This invention relates in general to injection moulding for plastic materials and, more specifically, to a nozzle for said injection moulding, of the type comprising a generally cylindrical body with a heating resistor wound on the external surface which is operatively connected to a controlling thermocouple.

In nozzles of this kind, the function of the heating resistor is evidently to keep the temperature of the nozzle at predefined values according to the composition of the melt plastic material to be injected. The thermocouple is connected to an automatic moulding process electronic control unit, which controls the electrical power to the heating resistor.

In such nozzles currently in use, an example of which is described and illustrated in European Patent EP-B-0750975 by MOLD MASTERS LIMITED, the efficiency of the moulding process automatic control is closely connected to the functionality, i.e. reliability, of the heating resistor and the respective thermocouple. This is because, in the event of failures to either one of the two components, the temperature of the injected plastic material can no longer be controlled in a suitable fashion, with consequent degrading of the moulding process. On the other hand, replacing the heating resistor or the associated thermocouple would mean stopping the moulding apparatus and be a critical problem, considering the high number of nozzles commonly used in one moulding apparatus.

SUMMARY OF THE INVENTION

The object of this invention is to overcome said problem. According to this invention, this object is attained by a nozzle which is provided with a second heating resistor, wound on the external surface, independent from said first heating resistor, and provided with an autonomous control thermocouple.

Thanks to this idea, the nozzle, and consequently the moulding apparatus where the nozzle is fitted, ensures confidence of operation which is double with respect to that of a traditional nozzle. The thermocouples of the two heating resistors are connected to the moulding process electronic control unit so as to selectively activate either one or the other of the two resistors according to their effective functionality. The two thermocouples can also be calibrated to differentiated values.

BRIEF DESCRIPTION OF THE DRAWINGS

The invention will be better explained by the following detailed description with reference to the accompanying drawings purely provided as non-limiting example, in which:

FIG. 1 schematically illustrates a simplified form of an axial cross-section of the nozzle for plastic material injection moulding according to a first embodiment of the invention, and FIG. 2 shows a variant of FIG. 1.

DETAILED DESCRIPTION OF THE INVENTION

With reference to FIG. 1, numeral 1 generally refers to a nozzle for plastic material injection moulding according to this invention. It must be stressed that, for the sake of simplicity of the illustration, the drawing only shows the external body of the nozzle, while the valve consisting of a mobile pin axially reciprocating and co-operating with a corresponding annular valve seat is omitted.

The body of the nozzle 1, generally indicated by numeral 2, is generically cylindrical with an internal axial passage 3. A spiral-shaped groove 4 is made in the external side of the body 2, in which a first heating resistor 5 and, according to this invention, a second heating resistor 6 are wound.

The resistors 5 and 6 are entirely independent from each other on a functional point of view.

In the shown embodiment the resistors 5 and 6 are arranged in a radially superimposed condition in the spiral-shaped groove 4, which has a depth correspondigly adapted to house both therein.

The two resistors 5, 6 are electrically connected independently one with respect to the other to a source of electrical power, via respective connection terminals which are not visible in the drawing and which are operatively connected (in a way which is known and however within the grasp of sector technicians) each with a respective thermocouple 7, 8.

The two thermocouples 7, 8, arranged in correspondence with the end of the body 2 destined to face inside the injection mould, are in turn independently connected to a moulding process electronic control unit (conventional and not shown in the drawings), which controls the electrical power to either one or the other resistor 5, 6 according to the predefined moulding process parameters. The electronic control unit also selects either one of the two resistors 5, 6 according to their effective functionality. In this way, for example, the first heating resistor 5 will be normally operative, while the second resistor 6 will be kept as a backup, to be made operative in the case of a failure concerning the first resistor 5 or the respective thermocouple 7.

A differentiated operation of the two resistors 5, 6, which are also automatically managed by part of the electronic control unit will be possible, if required by operating on the calibration of the respective thermocouples 7, 8. The variant shown in FIG. 2 is generally similar to the embodiment disclosed with reference to FIG. 1, and only the difference shall be disclosed in detail. In this variant the resistors 5 and 6 are arranged in an axially side-by-side condition in the spiral-shaped groove 4, which in this case has a width correspondigly adapted to house both therein.

Naturally, numerous changes can be implemented to the construction and forms of embodiment of the invention herein envisaged, all comprised within the context of the concept characterising this invention, as defined by the following claims.

What is claimed is:

1. A nozzle for injection moulding of plastic materials comprising a generally cylindrical body having an external surface, a first heating resistor wound on said external surface, and a second heating resistor wound on said external surface, wherein said first and second heating resistors are both disposed within a spiral-shaped groove, provided in said external surface of said cylindrical body, in a side-by-side condition and along a substantially same axial portion of said body.

2. Nozzle according to claim 1, wherein each of said first heating resistor and said second heating resistor is provided with a respective autonomous control thermocouple connected thereto.

3. Nozzle according to claim 2, wherein said first and second thermocouples are calibrated to differentiated values.

4. Nozzle according to claim 1, wherein said first and second heating resistors are functionally independent from each other.

5. Nozzle according to claim 1, wherein said first and second heating resistors are housed within said spiral-shaped groove at the same radial distance with respect to the axis of said body.

6. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition and along a substantially same axial portion of said body, and;

wherein each of said first heating resistor and said second heating resistor is provided with a respective autonomous control thermocouple connected thereto.

7. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition and along a substantially same axial portion of said body; and wherein said first heating resistor and said second heating resistor are housed within said spiral-shaped groove at the same radial distance with respect to the axis of said body.

8. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition; and wherein each of said first heating resistor and said second heating resistor is provided with a respective autonomous control thermocouple connected thereto.

9. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition; and wherein said first heating resistor and said second heating resistor are housed within said spiral-shaped groove at the same radial distance with respect to the axis of said body.

10. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition and along a substantially same axial portion of said body; and wherein each of said first heating resistor and said second heating resistor is provided with a respective autonomous control thermocouple connected thereto, and said first heating resistor and said second heating resistor are housed within said spiral-shaped groove at the same radial distance with respect to the axis of said body.

11. A nozzle for injection moulding of plastic materials comprising a generally cylindrical body having an external surface, a first heating resistor wound on said external surface, and a second heating resistor wound on said external surface and independent from said first heating resistor, wherein said first and second heating resistors are both disposed within a spiral-shaped groove, provided in said external surface of said cylindrical body, in a side-by-side condition; and wherein each of said first heating resistor and said second heating resistor is provided with a respective autonomous control thermocouple connected thereto, and said first heating resistor and second heating resistor are housed within said spiral-shaped groove at the same radial distance with respect to the axis of said body.

* * * * *